US008825635B2

(12) United States Patent
Ejsing et al.

(10) Patent No.: US 8,825,635 B2
(45) Date of Patent: Sep. 2, 2014

(54) AUTOMATIC VERIFICATION OF DATA SOURCES

(75) Inventors: Simon Kristiansen Ejsing, Copenhagen (DK); Søren Lindegaard Grubov, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 56 days.

(21) Appl. No.: 13/571,717

(22) Filed: Aug. 10, 2012

(65) Prior Publication Data

US 2014/0046969 A1 Feb. 13, 2014

(51) Int. Cl.
*G06F 7/00* (2006.01)
*G06F 17/30* (2006.01)

(52) U.S. Cl.
USPC .......................................................... 707/720

(58) Field of Classification Search
USPC .......................................................... 707/720
See application file for complete search history.

(56) References Cited

U.S. PATENT DOCUMENTS

| | | | |
|---|---|---|---|
| 5,950,004 A | | 9/1999 | Bearse |
| 6,006,224 A * | | 12/1999 | McComb et al. ............... 1/1 |
| 6,009,271 A | | 12/1999 | Whatley |
| 6,026,390 A * | | 2/2000 | Ross et al. ..................... 1/1 |
| 6,577,982 B1 | | 6/2003 | Erb |
| 6,591,266 B1 * | | 7/2003 | Li et al. ......................... 1/1 |
| 6,944,848 B2 | | 9/2005 | Hartman |
| 6,976,246 B1 | | 12/2005 | Rosaria |
| 7,000,224 B1 | | 2/2006 | Osborne, II |
| 7,089,534 B2 | | 8/2006 | Hartman |
| 7,159,209 B1 | | 1/2007 | Srinivasan |
| 7,181,450 B2 * | | 2/2007 | Malloy et al. ................. 1/1 |
| 7,813,911 B2 | | 10/2010 | Triou, Jr. |
| 2003/0046613 A1 | | 3/2003 | Farchi |
| 2003/0196191 A1 | | 10/2003 | Hartman |
| 2005/0256665 A1 | | 11/2005 | Hartmann |
| 2006/0075305 A1 | | 4/2006 | Robinson |
| 2006/0085681 A1 | | 4/2006 | Feldstein |
| 2006/0101397 A1 | | 5/2006 | Mercer et al. |
| 2007/0061780 A1 | | 3/2007 | Pokluda |

(Continued)

FOREIGN PATENT DOCUMENTS

WO WO0106419 A1 1/2001
WO WO0146865 A1 6/2001

OTHER PUBLICATIONS

Johnson et al. "Compliance with data protection laws using Hippocratic Database active enforcement and auditing". 2007. IBM Systems Journal. vol. 46, No. 2. pp. 255-264.*

(Continued)

*Primary Examiner* — James E Richardson
(74) *Attorney, Agent, or Firm* — Damon Rieth; Jim Ross; Micky Minhas

(57) ABSTRACT

A data source, such as a database, is modeled using state variables, state, and actions performed on the data source. State variable queries may be automatically generated by generating queries or functions based on intercepting data queries to a data source and using the intercepted data query language. State variable queries may automatically inspect data objects within the data store and automatically generate state variable values. The state variable queries or functions may be executed automatically after an action is run against a data source such that state information is automatically determined. Further, a graphical user interface used to modify, add and delete state information and automatic state variable queries associated with the verification model is described.

20 Claims, 12 Drawing Sheets

(56) References Cited

U.S. PATENT DOCUMENTS

| | | | |
|---|---|---|---|
| 2007/0168971 A1 | 7/2007 | Royzen | |
| 2009/0265370 A1* | 10/2009 | Rucker et al. | 707/102 |
| 2010/0057670 A1 | 3/2010 | Bates et al. | |
| 2010/0153431 A1* | 6/2010 | Burger | 707/769 |
| 2012/0047125 A1* | 2/2012 | Day et al. | 707/714 |
| 2012/0310918 A1* | 12/2012 | Johri et al. | 707/714 |

OTHER PUBLICATIONS

Pinto "Data Hashing in SQL Server". Aug. 26, 2011. SQL Server Security Blog. [retrieved on Dec. 5, 2013]. Retrieved from the Internet <URL: http://http://blogs.msdn.com/b/sqlsecurity/archive/2011/08/26/data-hashing.aspx>.*

Sebastian Wieczorek, Andreas Roth, Alin Stefanescu, Vitaly Kozyura, et al; Viewpoints for Modeling Choreographies in Service-Oriented Architectures , Sep. 14-17, 2009, 2009 & European Conference on Software Architecture. WICSA/ECSA 2009.

Nicolae Paladi, Model Based Testing of Data Constraints, May 2009, 8th ACM SIGPLAN workshop on ERLANG 09.

Larry Apfelbaum, John Doyle, Model Based Testing ,1997, Software Quality Week, 1997.

A. Bertolino, Marchetti E., Muccini, H., Introducing a Reasonably Complete and Coherent Approach for Model-Based Testing, 2004, Electronic Notes in Theoretical Computer Science.

S.R. Dalal, A. Jain, N. Karunanithi, J.M. Leaton, C.M. Lott, G.C. Patton, B.M. Horowitz, Model-Based Testing in Practice, May 1999, Proceedings of ICSE'99.

I.K. El-Far, J.A. Whittaker, Model-based Software Testing, 2001, Encyclopedia on Software Engineering, Wiley, 2001.

M. Barnett, W. Grieskamp, W. Schulte, N. Tillmann, M. Veanes, Model-Based Testing with AsmL.NET.

International Search Report and Written Opinion of the International Searching Authority regarding International Application No. PCT/US2013/054037 dated Jun. 4, 2014, 12 pages.

"PL/SQL Triggers", XP055119125, Retrieved from the Internet:<<URL:http://wayback.archive.org/web/20111124045045/http://docs.oracle.com/cd/E11882_01/appdev.112/e25519/triggers.htm [retrieved on May 21, 2014] Section "Using compound DML triggers to avoid mutating-table error"; pp. 11-12, Nov. 24, 2011, 38 pages.

* cited by examiner

AUTOMATIC VERIFICATION OF DATA SOURCES

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein relate to verification of data sources. Computer-related methods and systems described herein may be used to test or verify data within data sources. Embodiments herein may also be used for other computer related purposes, such as for auditing the state of data sources or logging state information.

One existing testing mechanism for verifying data sources includes use of models. For example, a data source, such as a database, may be modeled using state variables, model state and actions performed on the data source. Items such as state variables, model state, and actions may be stored in a model. They may be represented by textual and binary data. But a problem with models can be that it may be cumbersome to generate and maintain state variable information. Often, custom code may need to be written that determines state variable information based on inspection of data source values. In one aspect of the invention, a computer-related method described herein may be used to automatically determine state variable values. For example, queries or functions may be automatically generated that determine state variable values. Further, the queries or functions may be automatically executed before or after an action is run against a data source such that state information is automatically determined.

When performing data source transactions, it is often desirable to be able to roll back state. For example, if a transaction was erroneously executed, state needs to be rolled back. Similarly, when executing actions of a model, it may be desirable to roll back a model to a former state. As one example, this may be desirable when performing a traversal of all actions within a verification model, and it is desirable to return to a former state. A problem that may occur is that rolling back a transaction in a database or performing a rollback action in a model may use up computational time and resources. Another aspect of the invention is that changes in state variable information may be stored in a cache or other storage.

When testing a data source, it may be desirable to perform many or all actions between two states within a model. The order in which actions are executed may allow for advantages. For example, by performing actions in a depth-first traversal order, it becomes easy to ensure that every action is performed and that changes in state may be rolled back using cached or stored state variable information.

Another problem is that it may be difficult to maintain a model of a data source. A user may need a graphical user interface to modify, add and delete state information associated with the verification model. Further, a problem can be that code may be manually entered in order to maintain state variable information. Yet another aspect of the invention describes a graphical user interface that may be used to automatically generate, store and maintain queries or functions associated with state variable information and maintain state, actions or other items associated with data source models. Further, a graphical use interface that may be used to efficiently view test or verification results is described.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of present examples and is not intended to represent the only forms in which the present examples may be constructed or utilized. The description sets forth functions of the examples and sequence of steps for constructing and operating the examples. However, the same or equivalent functions and sequences may be accomplished by different examples.

Figure 1:
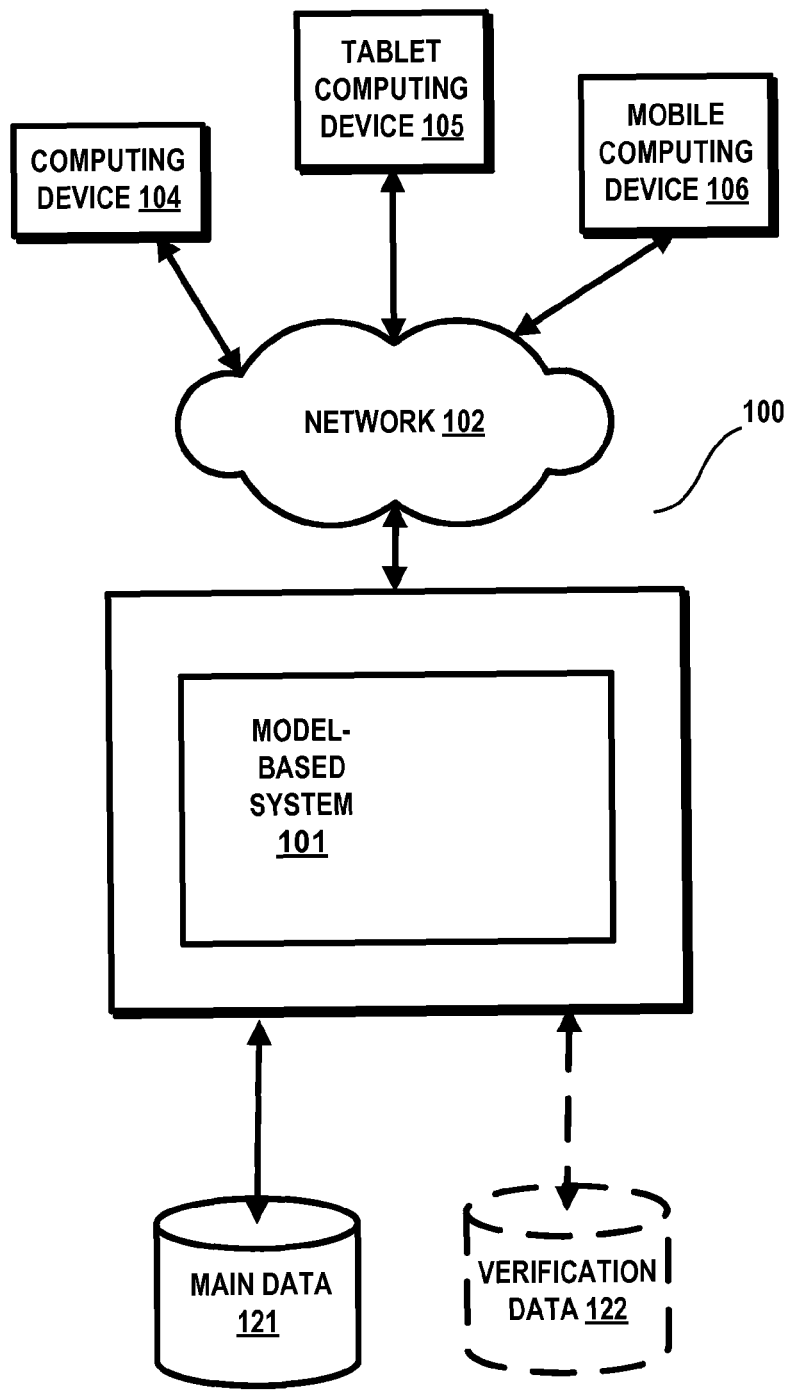
FIG. 1 is a block diagram of an example operating environment for implementing embodiments of the invention.

FIG. 1 shows an embodiment of an operating environment 100 for implementing embodiments of the invention. FIG. 1 and the following discussion are intended to provide a brief, general description of a suitable computing environment to implement embodiments of the invention. The operating environment 100 is only one example of a suitable operating environment. FIG. 1 illustrates a model based verification system on one or more servers, but it is to be appreciated that the model based verification system may also just execute on one or more client computing systems, or still further, it may execute on a combination of client and server computing systems.

Referring to FIG. 1, operating environment 100 includes a network 102. Network 102 may be the internet, or network 102 may comprise an intranet, and the like. A model based system 101 may communicate with computing devices 104, 105, and 106 over network 102. An example computing device is described below in connection with FIG. 2. Computing device 104 may include any type of personal computer, such as a desktop computer, mainframe computer, and the like. Tablet computing device 105 includes slate or tablet devices that may be personally carried and used for browsing online services. Mobile computing device 106 may include smart phones, or other mobile computers. Each computing device 104-106 may be used to either access or run verifications of data source models.

Model based system 101 is an exemplary server or servers configured to provide model based verification online. Model based system 101 may send binary data, XML data, HTML, or other markup language to the client devices 104-106 via network 102. Model based system 101 is configured to communicate with a main data source 121 and, optionally, verification data source 122. Main data source 121 and verification data source 122 may, in fact, be stored in one data store file, such as a database, or the data may be stored across a plurality of data sources. Main data source 121 may store the data to be verified and verification data source 122 may store information related to the verification model, actions, states, state variables, or other information related to the verification model. Main data source 121 and verification data source 122 may be implemented with one or more files, database, or other storage mechanisms. The data sources 121 and 122 may, optionally, be indexed to facilitate fast access.

Figure 2:
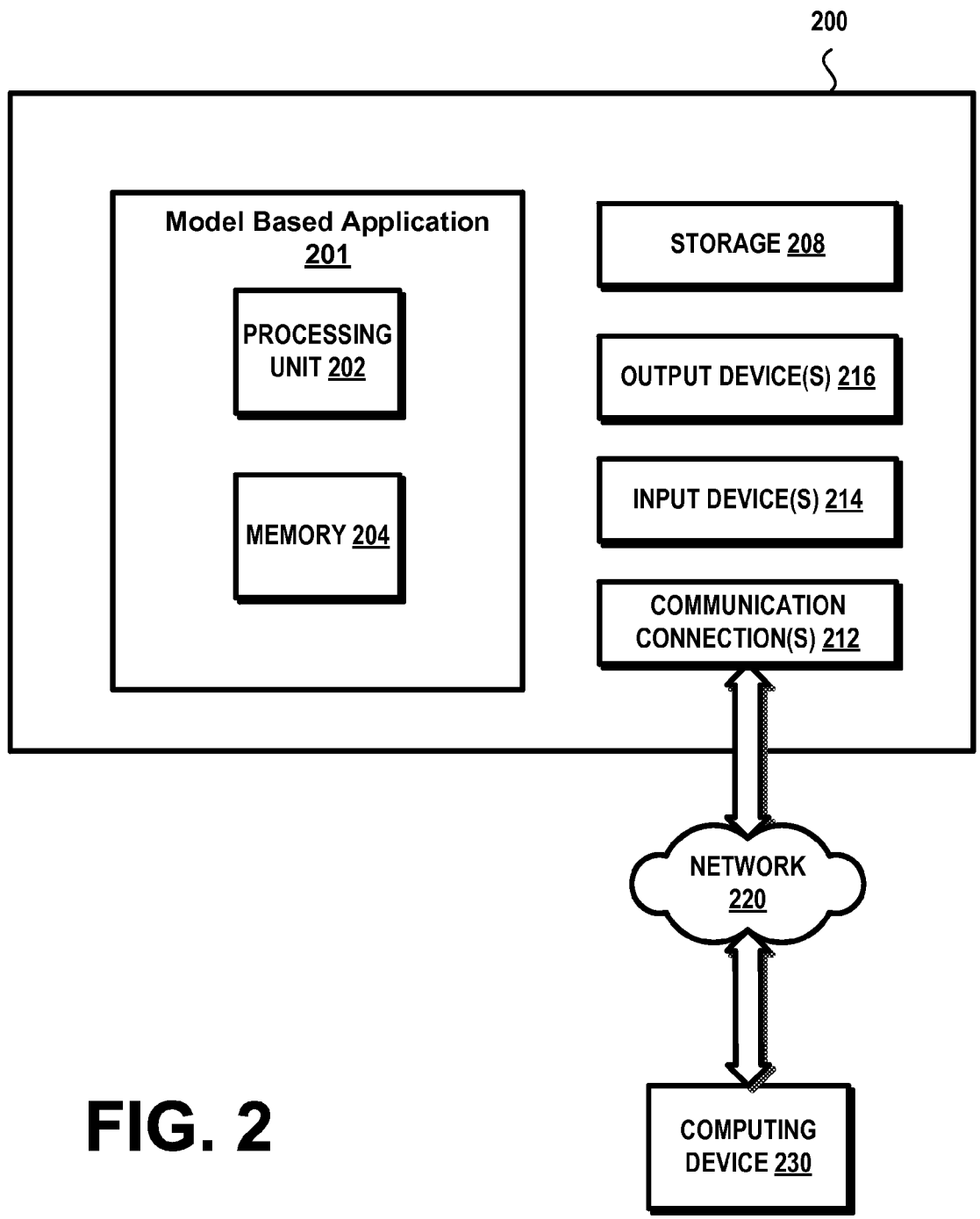
FIG. 2 is a block diagram of an example computing device for implementing embodiments of the invention.

FIG. 2 shows an embodiment of a local computing device 200 for implementing one or more embodiments of the invention. FIG. 2 illustrates a computing device 200 that may display model information on the computing device 200 itself or send or receive data representations about the model to another computing device. Computing device 200 may be a personal computer, a mobile device computer, a tablet device computer, a system on a chip or any other computing device. In one embodiment, computing device 200 may be used as system 101 of FIG. 1. In that embodiment, main data source 121 and verification data source 122 may be stored locally in storage 208, or data sources 121 and 122 may be stored remotely. In another embodiment, computing device 200 may be used as a client system that receives model information from a remote system. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. Model based application 201 may store data and instructions in memory 204 and use processing unit 202 to execute computer instructions.

Additionally, computing device 200 may also have additional hardware features and/or functionality. For example, computing device 200 may also include hardware such as additional storage (e.g., removable and/or non-removable) including, but not limited to, magnetic or optical disks or tape. Storage 208 is illustrated in FIG. 2 by storage 208. In one embodiment, computer readable instructions to implement embodiments of the invention may be stored in storage 208. Storage 208 may also store other computer readable instructions to implement an operating system, an application program (such as an applications that runs on the model based system 101), and the like.

Embodiments of the invention will be described in the general context of "computer readable instructions" being executed by one or more computing devices. Software may include computer readable instructions. Computer readable instructions may be distributed via computer readable media (discussed below). Computer readable instructions may be implemented as program modules, such as functions, objects, methods, properties, application programming interfaces (APIs), data structures, and the like, that perform particular tasks or implement particular data types. Typically, the functionality of the computer readable instructions may be combined or distributed as desired in various environments.

The term "computer readable media" as used herein includes computer storage media. "Computer readable storage media" includes volatile and nonvolatile, removable and non-removable media implemented in any method or technology for storage of information such as computer readable instructions, data structures, program modules, or other data. Memory 204 and storage 208 are examples of computer storage media. Computer readable storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices. "Computer readable storage media" does not consist of a "modulated data signal." Any such computer storage media may be part of device 200.

The term "computer readable media" may include communication media. Device 200 may also include communication connection(s) 212 that allow the device 200 to communicate with other devices, such as with other computing devices through network 220. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Computing device 200 may also have input device(s) 214 such as keyboard, mouse, pen, voice input device, touch input device, gesture detection device, laser range finder, infra-red cameras, video input devices, and/or any other input device. Input device(s) 214 may include input received from gestures or by touching a screen. For example, input device(s) 214 may detect swiping the screen with a finger, or one or more gestures performed in front of sensors (e.g. MICROSOFT KINECT). Output device(s) 216 includes items such as, for example, one or more displays, projectors, speakers, and printers.

Those skilled in the art will realize that computer readable instructions may be stored on storage devices that are distributed across a network. For example, a computing device 230 accessible via network 220 may store computer readable instructions to implement one or more embodiments of the invention. Computing device 200 may access computing device 230 and download a part or all of the computer readable instructions for execution. Communication connection 212 and network 220 may be used to facilitate communication between computing device 200 and computing device 230. Network 220 may include the internet, intranet, or any other network. Alternatively, computing device 200 may download pieces of the computer readable instructions, as needed, or some instructions may be executed at computing device 200 and some at computing device 230. Display representations may be sent from computing device 200 to computing device 230 or vice versa. Those skilled in the art will also realize that all or a portion of the computer readable instructions may be carried out by a dedicated circuit, such as a Digital Signal Processor (DSP), programmable logic array, and the like.

Data Source Models

Embodiments of the invention provide a mechanism for automatic determination of state. In particular, the automatic determination of state may be used for verification of data sources, logging of state, auditing, or other purposes.

A model may represent a data source, such as a database. The model may comprise one or more states. Each state of the model may be measured using one or more state variables. Actions may be performed against the data source, and each action may cause a change in state of the data source.

As just one example, a data source, state, state variables and actions may be illustrated by reference to a detailed example. A data source may be a database. As just some examples, without limitation, a database could be implemented with MICROSOFT SQL SERVER, an ORACLE database, an IBM database, GOOGLE STORAGE, or any other data store or database. By way of the example, the database may initially comprise two tables, TABLE 1 and TABLE 2. TABLE 1 may comprise 5 rows and TABLE 2 may comprise 10 rows. A model may initially comprise two state variables STATE_TABLE1 and STATE_TABLE2. STATE_TABLE1 may be initialized to a row count of 5 (the row count for TABLE 1) and STATE_TABLE2 may be initialized to a row count of 10 (the row count for TABLE 2). A first action may modify TABLE 1 by adding 1 row to TABLE 1. The first action could comprise execution of a Structured Query Language (SQL) statement to insert a row into TABLE 1. A second action could comprise execution of a SQL statement to delete a row from TABLE 2. After execution of the first action and the second action, the state variables STATE_TABLE1 and STATE_TABLE2 would need to be re-calculated to 6 and 9 respectively. An overall state for the model may be calculated by taking all of the state variables into consideration. Each combination may determine an overall state of the model. Using the example where row counts are used as state variables, {5,10} may be a first initialized state for the model, and it may be represented as state 0. {6,10} may be an intermediate state after a row has been added to TABLE 1, and it may be represented as a model state of 1. {6,9} may be another intermediate state after a row has been deleted from TABLE 2, and it may be represented as an overall model state of 2. In short, a combination of state variable values may represent a state of the model.

State variables may measure state of a data source. Row count of a table is just one example of a state variable. Other examples of state variables may include, without limitation, the number of tables, the number of views, the number of stored procedures, the average of values within a data source field, the total of values within a field. Still other examples include a hash of text or binary data, or a checksum computed from binary or text data. A state variable may be computed as any function of values within a field. The state variables may be measured by queries that have been automatically generated, inline functions, code, or other means.

Graphical User Interface for Verification of Data Sources

Figure 3:
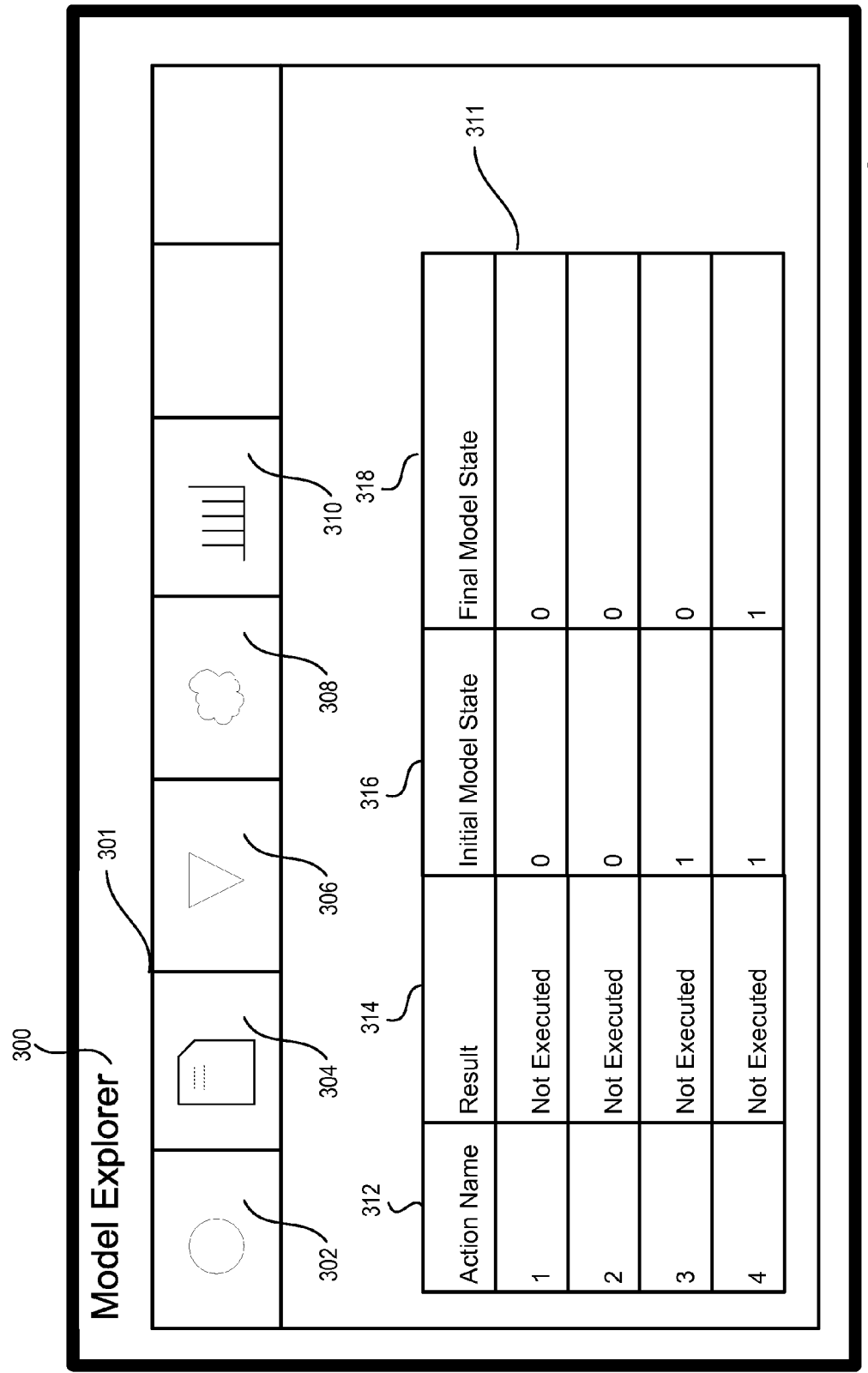
FIG. 3 is a graphical user interface for exploration of a verification model.

FIG. 3 is a graphical user interface for exploration of a verification model. The graphical user interface 300 may be used to illustrate state within a model. Graphical user interface 300 may comprise controls in the form of menus, a ribbon bar, toolbars, floating command dialogs, or other controls. In user interface 300, a ribbon bar 301 is depicted. Control 302 may allow a user to create a new verification model. Control 304 may allow a user to visualize a verification model. Control 304 may display further user interfaces, such as a user interface depicted by any one of FIGS. 5-8. Control 306 restores the state of the verification model back to the initial state. Control 308 allows visualization of snapshots of the model state. Control 310 displays the model as a chart.

FIG. 3 also includes a list control 312 that may list one or more actions that may be executed against a data source in list control 312. Whether an action has been executed is depicted in 314. An initial overall model state 316 may be depicted within a column before an action is executed, and a final overall model state 318 may be displayed after the action is executed.

Figure 4:
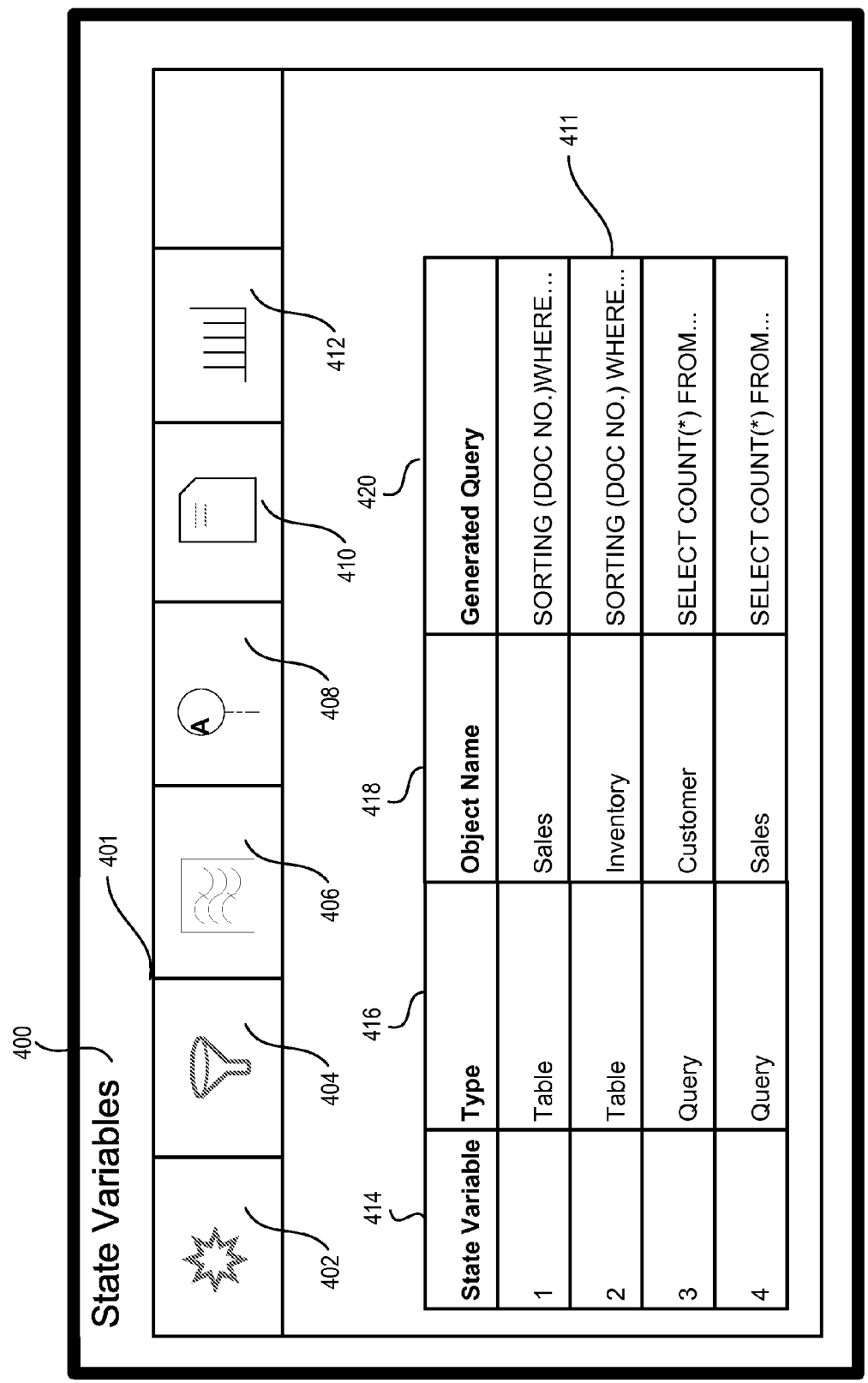
FIG. 4 is a graphical user interface for display, addition, modification and deletion of state variables associated with the verification model.

FIG. 4 is a graphical user interface for display, addition, modification and deletion of state variables associated with the verification model. Dialog window 400 includes controls for visualizing state variables. Ribbon bar 401 displays controls that manipulate state variables associated with the model. Control 402 allows for creating a new state variable. Control 404 allows for filtering state variables. Upon activation of control 404, a user may set criteria by which a filtered list of state variables is shown in list 414. Control 406 activates states and control 408 activates state transitions. Control 410 allows initialization of state variables. Control 412 allows a graphical chart view of the state variables.

FIG. 4 also depicts a list 411, with a row comprising information about each state variable. List 414 depicts identifiers associated with each state variable. Identifiers may be numeric, strings or any other data type that may hold an identifier. Type column 416 includes a selection of a type of data source object that is in association with the state variable. For example, a type Table may correspond with a table of a database. A type query may correspond with a SQL, OLAP, MDX or other type of database query. Other object types may include views, stored procedures, inline functions, triggers, or other type of database object. The type may be selectable via a dropdown. Object name column 418 depicts the specific object of type column 416 within the data store that is being measured for the state variable. For example, in the context of data stores for Enterprise Resource Planning (ERP) information, a data store may include a Sales table and an Inventory table. An ERP data store may also include a Customer query and a Sales query. These objects may be named in 418 so that each state variable is associated with the state of a specific object within the data store.

Still referring to FIG. 4, list 411 also comprises a generated field 420. This aspect of the invention is displayed in association with a state variable. A state variable may be generated using a static or dynamic analysis. Field 420 may display a query generated from static analysis after a data query is executed, or a data query intercepted from dynamic analysis, and the data query may be used to construct a state variable query that determines the state variable value.

In a dynamic analysis, a query may be intercepted before it executes against a data source. The data returned from the query may be associated with a state variable. In a static analysis, a query may be automatically generated to measure the state of an object in the data source.

Whether generated via a static analysis or dynamic analysis, the automatically generated state variable query may vary based on the object, object type, or other characteristics of the database object that is being created, updated or deleted. For example, if the object type is a table or a view, an automatically generated query may measure the count of rows of the table. Equally, the automatically generated query may measure values within a field of the data store. For example, a generated query may measure the maximum, minimum, average, sum or other arithmetic operation of values within a field.

As another example, a generated query may measure errors within data. For example, if it would be an error to include duplicate values within a field, a query may determine how many duplicates exist.

Figure 5:
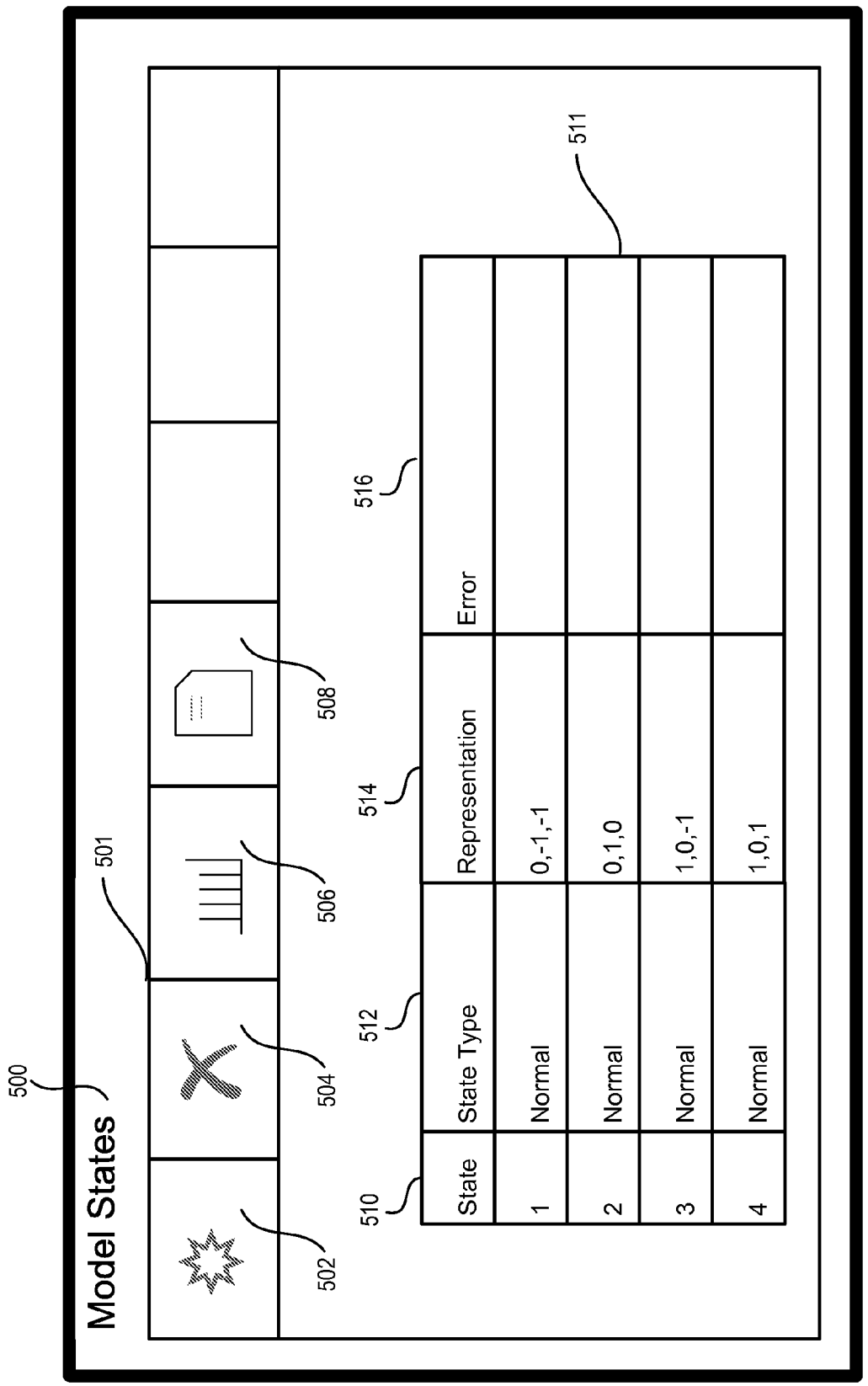
FIG. 5 is a graphical user interface displaying states of the verification model.

FIG. 5 is a graphical user interface displaying states of the verification model. Model states represent the overall state of a verification model. A state of a model may include a combination of state variable values. Each combination may be represented by a state variable value. User interface 501 displays model states. A menu, toolbar or ribbon may comprise controls. Actuating control 502 creates a new model state. Control 504 may delete a state that is selected in list 511. Control 506 may display a graphical chart view related to the model states. Control 508 may display notes associated with a model state.

Still referring to FIG. 5, field 510 lists model states. Each model state may be represented by a numerical or string value depicted in field 510. State type 512 may indicate a type of model state. Representation field 514 may list the combination of state variables associated with the model state. Error field 516 may indicate any errors associated with the model state.

Figure 6:
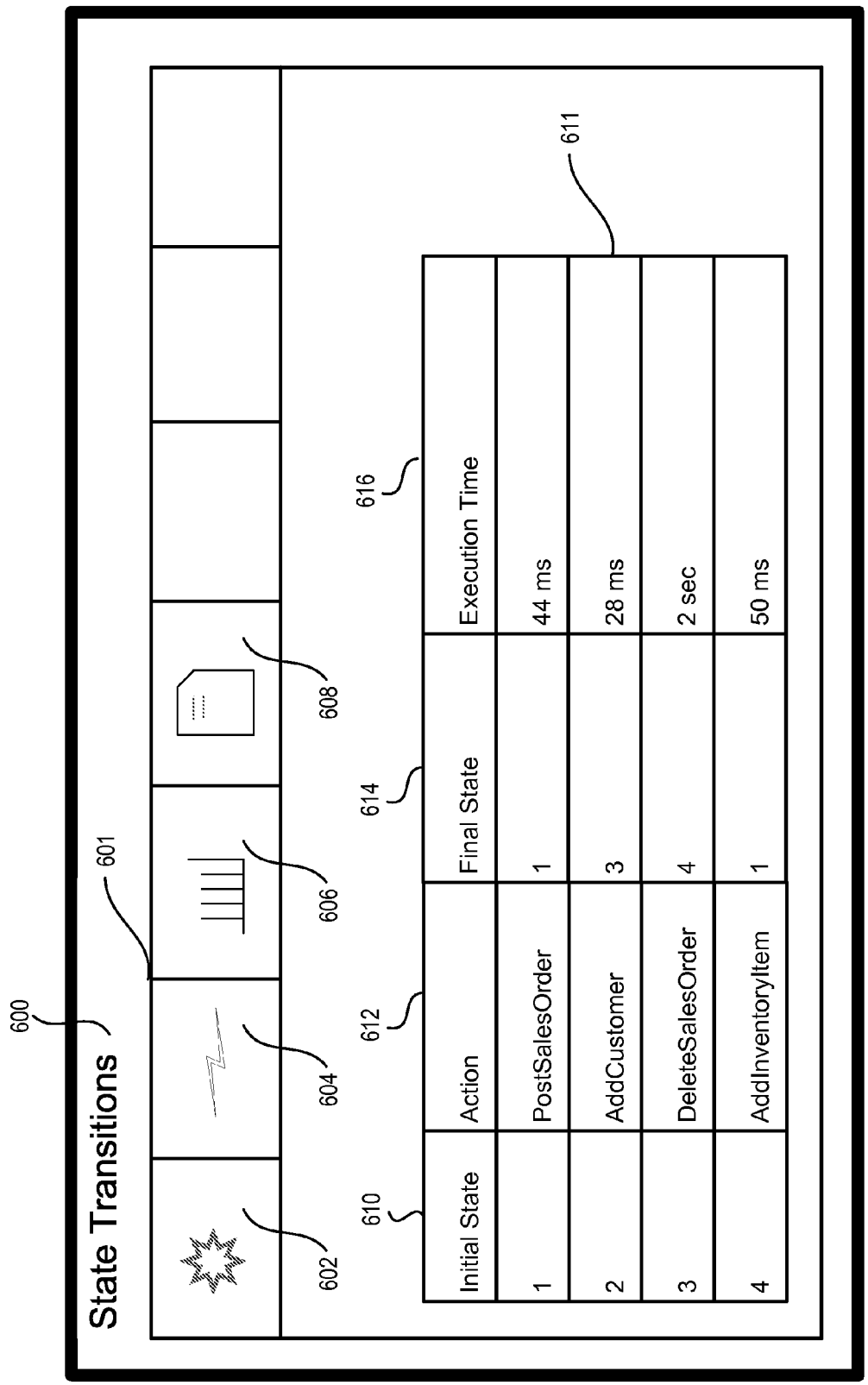
FIG. 6 illustrates a graphical user interface displaying state transition information related to the verification model.

FIG. 6 illustrates a graphical user interface displaying state transition information related to a verification model. User interface 600 displays various actions, the state each action generated, and execution time associated with each action. Menu, toolbar or ribbon bar 601 may include controls to add, modify or delete state transition information. Each state transition is accomplished via an action. An action performs an operation on the data source. An action may involve execution of one or more data queries to create, update or delete data. Each action may or may not cause a change in state of the data source and verification model associated with the data source. Actuating control 602 causes a new state transition to be created in list 611. Control 604 may delete a selected state transition. Control 606 may display a graphical chart view of the state transitions. Control 608 may display a list view of state transitions.

Still referring to FIG. 6, list 611 shows a plurality of actions that may modify the data source, and thereby modify state of the associated verification model. Field 610 may display the initial model state before an action is executed. Field 612 may list an action, that when executed, causes the data source and model to change. In list 611, examples are selected from the Enterprise Resource Planning domain. However, actions may be in any subject domain. As examples, actions may post a sales order by adding a row to a Sales table. In field 612, AddCustomer may add a customer record to a Customers table or view. DeleteSalesOrder may delete a sales order, and AddInventoryItem may create a new record in an Inventory table or view. Field 614 may display the model state after the action has been executed. Some actions may not, in fact, affect the state. For example, referring to list 611, PostSalesOrder appears to not affect the model since Initial State and Final State are both set to the same value. This may occur because there are not enough state variables measuring the state of the associated data source, or it may be that an action does not have an effect on a data source. In the example of list 611, an execution time field 616 is displayed. The execution time field 616 shows how long each action took to execute. Displaying the execution time associated with each action has a technical advantage of allowing architects and engineers to find performance bottlenecks in the data source and consider efficiency and performance optimizations. For example, actions that may take a long time to execute may be reduced.

Traversal of a Verification Model

Figure 7:
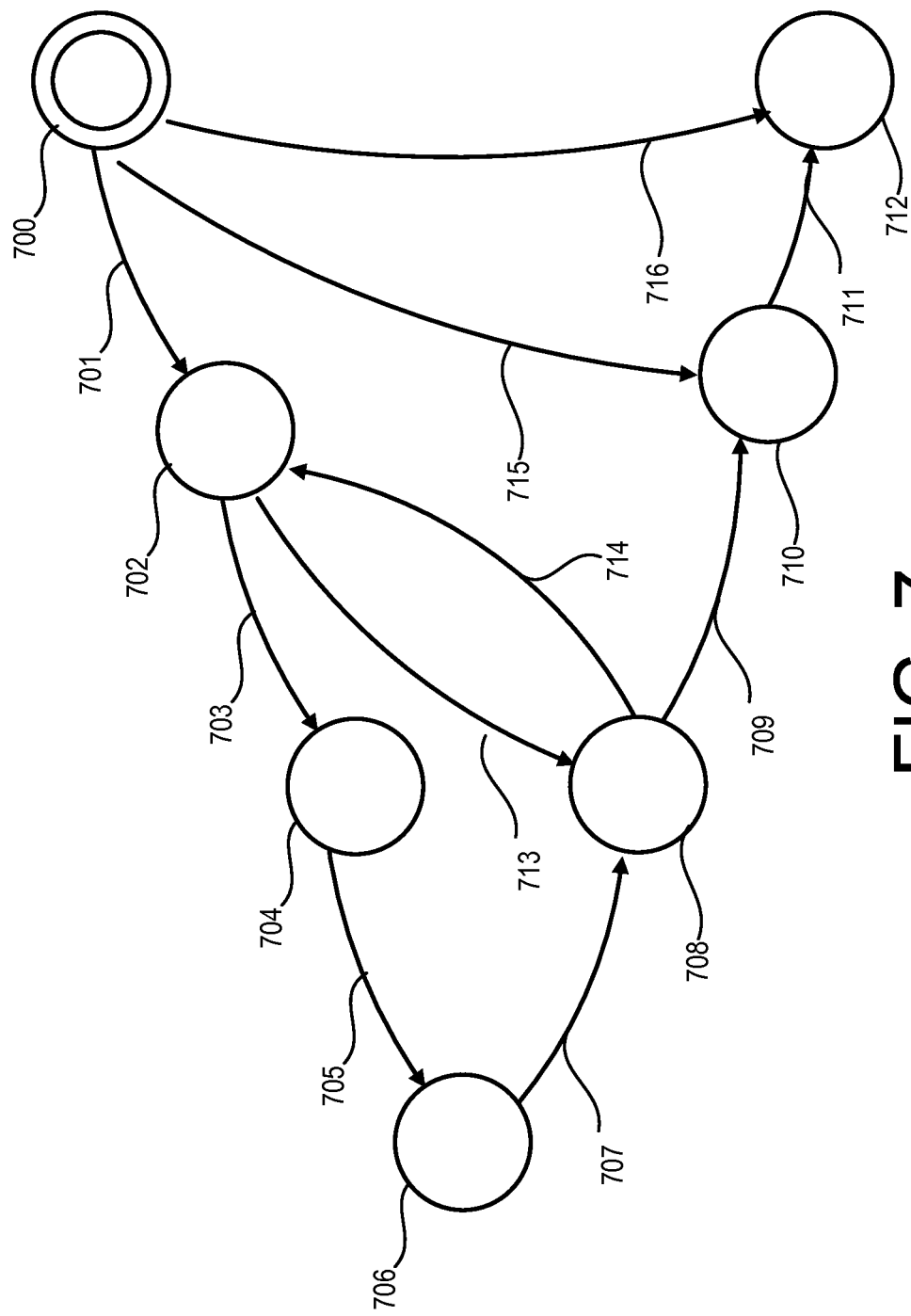
FIG. 7 illustrates a data model showing states and state transitions for a verification model.

FIG. 7 illustrates a data model showing states and state transitions for a verification model. A goal of executing actions in the model may be to execute every action between any two states. If all the possible actions have been represented, then it should be possible to detect errors in the data source. Similarly, another advantage can be that be performance optimization of the data source may be improved if any action takes too long. To illustrate traversal of all actions between any two states, a depth-first traversal of FIG. 7 may be illustrated step by step. Again, actions may be performed in any order including breadth-first, or any other random order. In the example of FIG. 7, the model is depicted as starting at initial state 700. From any state, any action may be performed leading away from the state. For example, from initial state 700, action 701, action 715 or action 716 could be executed. Nonetheless, it may be advantageous to execute test actions in a depth-first or a breadth-first order so that every action may be executed and cached. Stored state variable information may be used when winding back to a former state.

Still referring to FIG. 7, a depth-first traversal of the model may be described. At initial state 700, a first action 701 is performed, and that first action causes a change in the data source, such that the associated verification model transitions from initial state 700 to state 702. From state 702, action 703 is executed, and that leads to state 704. At state 704, action 705 is executed and that leads to state 706. At state 706, action 707 is executed and that leads to state 708. At state 708, still executing a depth-first strategy, action 709 is executed leading to state 710. At state 710, execution of action 711 leads to state 712. At state 712, there are no further actions that may be executed. The model has reached the limits of the first depth. As such, traversal would unwind back to a state within the path of states that it had traversed until a state with another outgoing action is found. In the case of FIG. 7, and winding back along the traversal path, state 708 has an outgoing action over to state 702. At state 702, action 713 may then be executed to get back to state 708. Because action 709 and 714 have now already been executed, traversal would unwind back to another state that has a new action that has not been previously traversed. In the case of FIG. 7, traversal would unwind back to initial state 700, whereby action 715 would be executed to reach state 710. Because the only outgoing action 711 has already been executed, depth-first traversal would unwind back to initial state 700, whereby action 716 would execute leading to state 712. At that point, since there are no outgoing actions in state 712, traversal would unwind back to initial state 700. Since there are no other outgoing actions to execute, the depth-first traversal of the model in FIG. 7 is complete. Any errors that occurred from a transition from one state to another, or any performance problems encountered during action execution would be detected.

Figure 8:
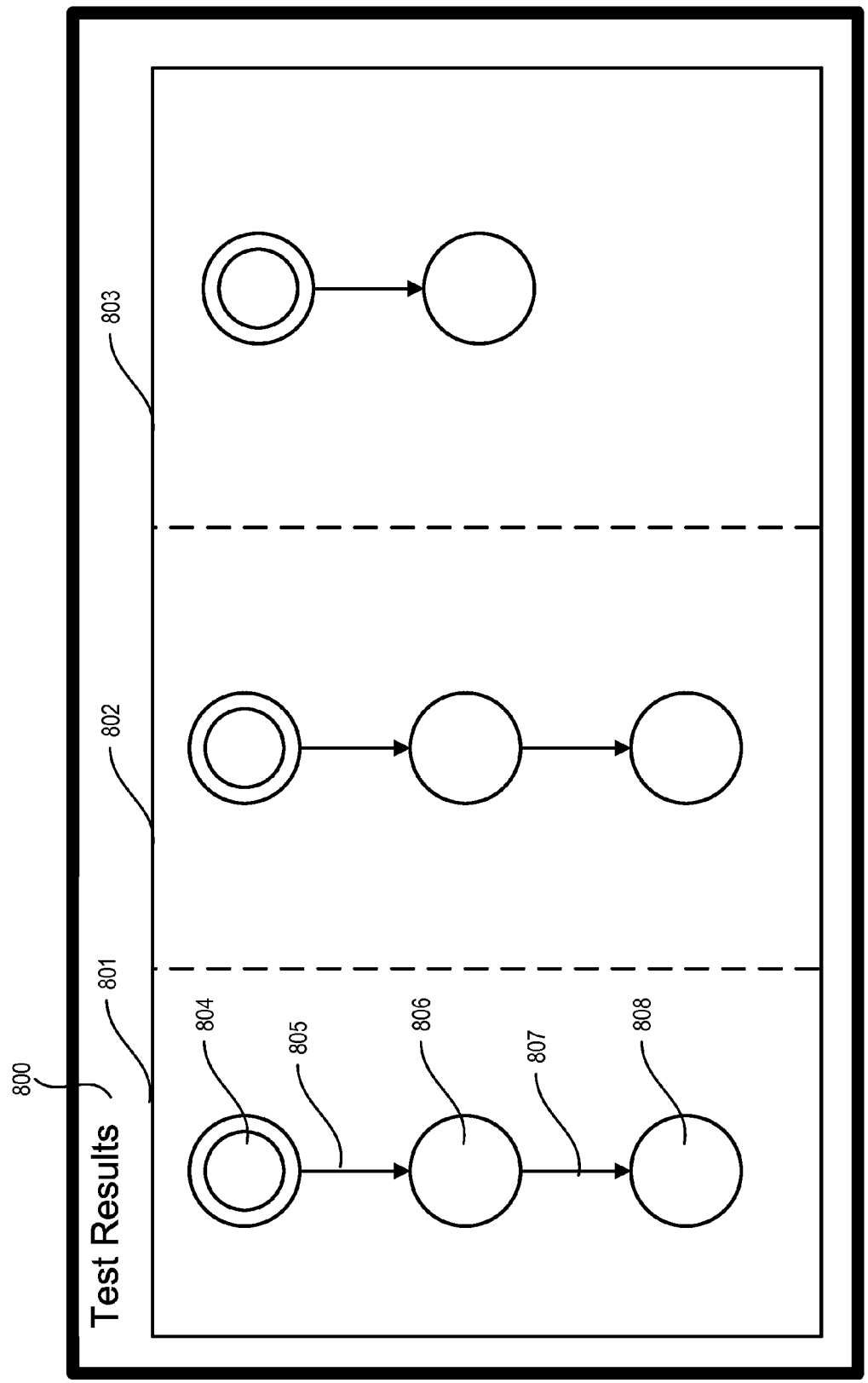
FIG. 8 illustrates a graphical user interface for displaying test results of the verification model.

FIG. 8 illustrates another user interface for displaying test results of a verification model. In FIG. 8, individual paths through states of the model may be shown. Display user interface 800 displays 3 paths 801, 802 and 803. Verification path 801 shows a path from initial state 804, action 805, leading to state 806, action 807 and final state 808. Paths 802 and 803 illustrate other individual paths through the model.

Figure 9A:
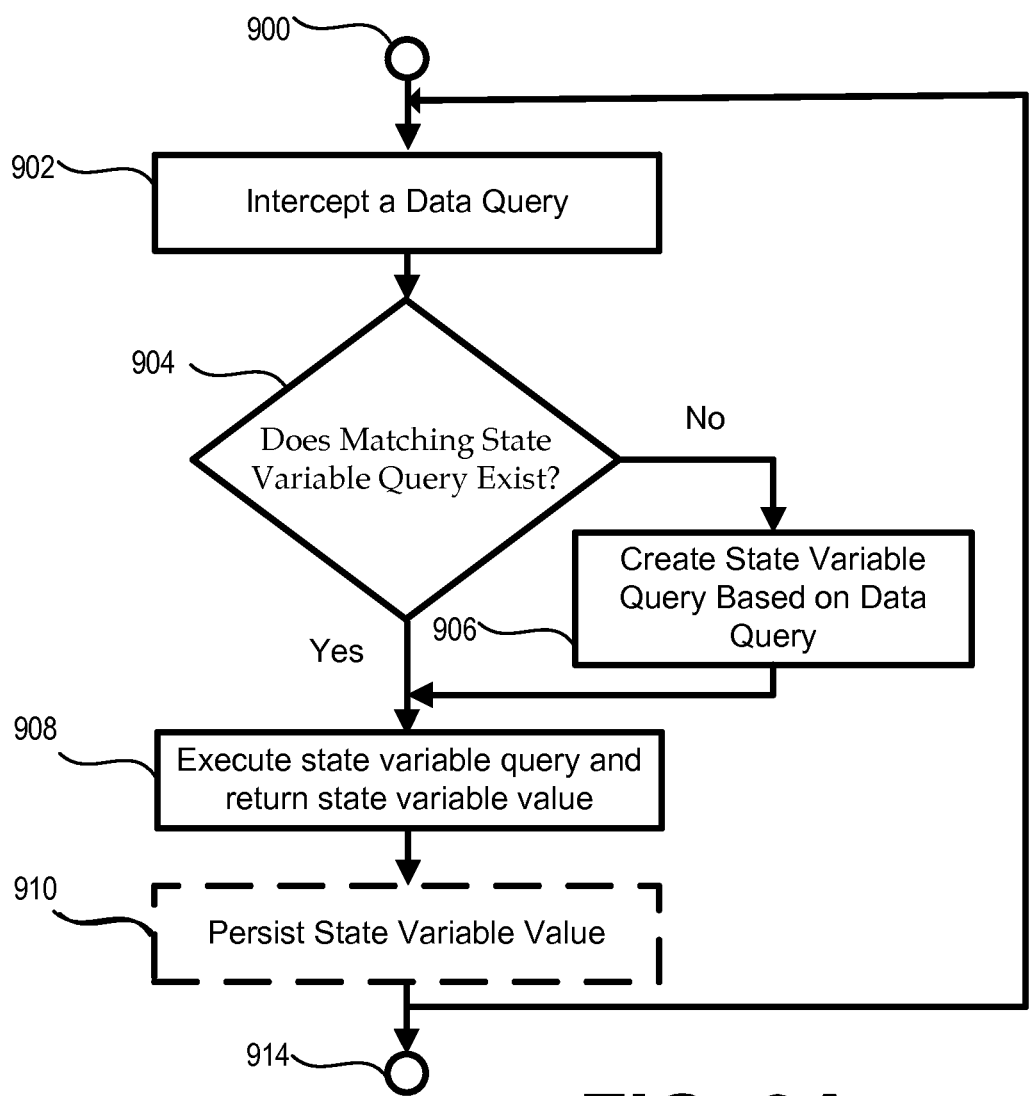
FIG. 9A illustrates a computer related method of automatically measuring states of a data source using a dynamic data query analysis and automatically generating a state variable based on a dynamic interception of a data query.

Automatic Determination and Measurement of State Variables by Dynamic Analysis of Actions FIG. 9A illustrates a computer related method of automatically measuring states of a data source and automatically generating state variable values. FIG. 9A may be termed a dynamic analysis. Herein, a dynamic analysis means that an analysis is based on intercepting queries, functions, triggers or other data manipulation mechanisms, and generation of a state variable based on the query or a variant of the query. One technical advantage of a dynamic analysis is that the method or system is fast because it is able to intercept and make use of the query itself in order to measure state. Another technical advantage is that a system that intercepts all queries to a data source assures a model that is capturing many possible actions. As an example of creation of a state variable query from a data query, if a query to select a row to TABLE1 is intercepted, it may be transformed from a SELECT query into a SELECT COUNT query. The database object that it operates on (e.g., TABLE1) and the WHERE clause of the query, if any, may be left intact without modification.

Any data query type may be intercepted and converted into a state variable query. For example, the data query may involve data modification, such as an INSERT, DELETE, UPDATE or REPLACE query. Equally, the data query may involve a SELECT operation. Equally, the data query may involve any other data function, including any SQL function or user-defined function.

The computer related method of FIG. 9A depicts how a state variable may be generated automatically using a dynamic interception of data queries or other data manipulation mechanisms in which the command is intercepted. Referring to FIG. 9A, at initial state 900, a verification model of a data source has been generated. At step 902, a data query is intercepted. This may be via an event that is raised within the data source system itself, or it may via code of a system. At conditional step 904, the data query is parsed to compare with existing state variables. If it is determined that a state variable query that is associated with this data query already exists, the computer related method proceeds to step 908. If the conditional step 908 determines that the data query is not yet associated with a state variable query, the computer related method proceeds to step 906. At step 906, a state variable query is created in association with the data query. The state variable query may then be persisted with the data source model by adding the state variable query to a collection of state variables.

As mentioned previously, the state variable query may be generated based on parsing the data query. For example, a state variable query may be created by truncating away the data modification action from the query, and maintaining the database object and condition logic of the data query. As just one example, the tables on which the data query operates, join information, and the WHERE clause may be kept after parsing the data query, and the query may be transformed to a SELECT COUNT(*) query to determine the number of rows within the tables. As another example, the state variable query may be similar or the same as the data query, and the data returned from the data query may be used as the state variable value.

After step 906, the computer related method proceeds to step 908. In step 908, the state variable query is executed and the data associated with the state variable query is captured. For example, if the state variable query is a SELECT statement that counts the number of rows in a table, the state variable value may include the number of rows. At optional step 910, the state variable value may be persisted in a data store. Other model data, such as the state variable name and action (e.g., the data query) may be persisted along with the state variable value. The value may be persisted in a model data store or in any other data store.

One mechanism for dynamic interception of data queries to a database is via SQL triggers. For example, a trigger may execute a function after any insert, modify, or delete operation of a table in a database. As an example, if a table has three fields, the system may auto-generate state variables reflecting the outcome of trying to set each field to a value. This example may be expanded to allow for evaluation of the effect of executing an action which references the table. The different effects of an action may be detected by testing an action against different versions of a table. Effects may be grouped such that inputs are correlated with effects. The result may be a set of masks on the inputs with related effects.

In performing a dynamic analysis of a data source, various methods may be used to determine a state variable. As mentioned previously, statistical functions such as a count, minimum, maximum, average, standard deviation or other function may be computed from the contents of a field that was specified by a data query. In the case of a text field, a hash function may be computed. By re-determining a hash function after an action is performed, any difference could be detected and it would be determined that an action has modified a text field. Yet another example of a state variable that may be generated is a checksum for binary or text data within a field.

Figure 9B:
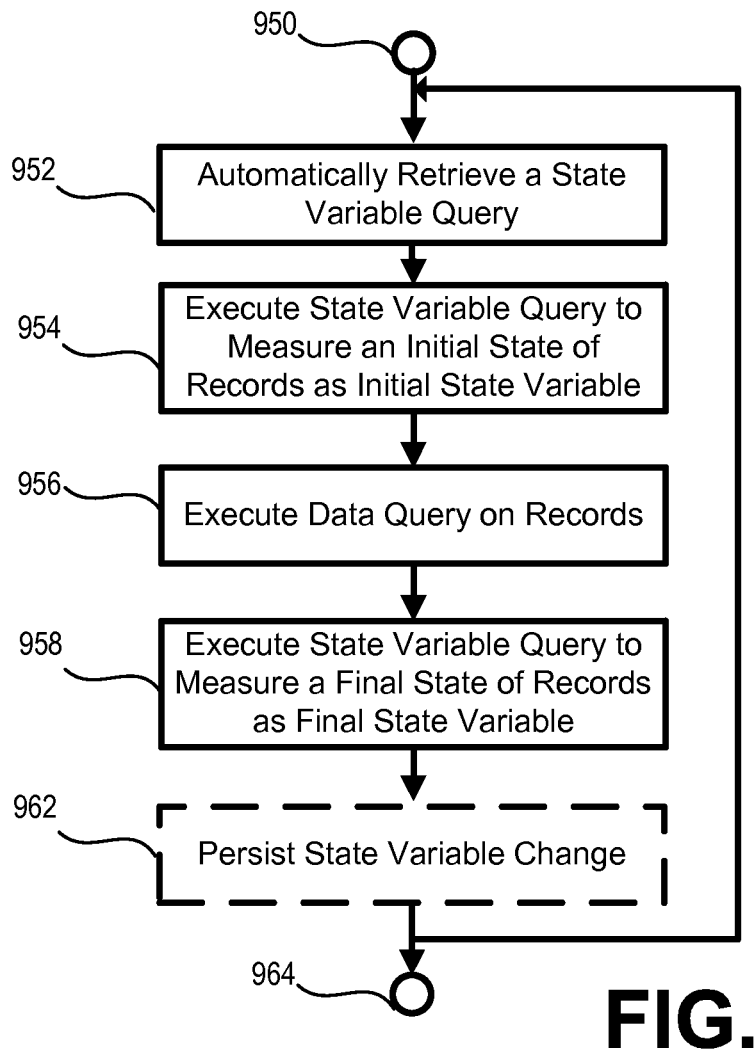
FIG. 9B illustrates a computer related method of automatically measuring states of a data source using a static data source analysis and automatically generating a state variable value based on a measurement before and after a query has been executed against a data source.

Automatic Determination and Measurement of State Variables by Static Analysis of Data Source Before and after Actions FIG. 9B illustrates a computer related method of automatically measuring states of a data source and automatically generating state variable values based on detected differences in state between an action. FIG. 9B may be termed a static analysis. Here, a static analysis means that an analysis is based on measuring the state of a data source before and after a data action, such as a data query, is executed against a data source, and a determination of a state variable is based on the state of the data source before or after the data query has been executed. A technical advantage of a static analysis is that the method or system does not need to intercept queries, functions, or other items that may input or extract data from a data source. The method does not need to know any details of how data gets into a data source. Instead, a static analysis performs an analysis of the data before and/or after an action is performed.

Referring to FIG. 9B, at initial state 950, a verification model of a data source has been generated. For example, some or all of the verification model may be generated via computer tools that analyze a data source. Inspections of the data objects within the data source, such as inspection of tables, views, stored procedures, functions, triggers, or other objects within a data source may allow generation of model states, state variables, or actions to be performed against the data source (such as records to be added, deleted or modified).

In one embodiment, a query associated with a state variable may be automatically generated and run before and/or after actions. For example, this may be performed by mapping a type of data source object to a stored type of query operator or function. For example, if a database table is encountered, a Structured Query Language (SQL) COUNT function may be used to count all of the rows. In another embodiment, SQL functions may be used to determine state variable information about data values. For example, a number of Sales or Purchase Orders may be 0 or more. A SQL function MIN( ) may be used to determine the minimum value of Sales or Purchase orders within a field. If a state variable, such as the number of sales or purchase orders, is determined to have an invalid value, such as a negative value, an error may be logged.

Still referring to FIG. 9B, at initial state 950, an action to be executed against a data source may be already determined. At step 952, a state variable query is retrieved from storage. The State variable query may be retrieved from the model or any other data source. The state variable query may have been manually constructed after inspection of a data source schema, or the state variable query may have been automatically generated based on automatic inspection of the data source schema, prior interception of queries, or any other method. At step 954, an automatic measurement of an initial state of records within the data source may be performed using the state variable query. The state variable query may be executed against the data source and the return value be stored as the state variable value. For example, a state variable query SQL statement may count the number of records within a table or view. In the alternate, the measurement may be made via a specification of a function generated in a programming language. At step 954, the initial state of the records would be recorded. At step 956, an action would execute against the records in the data source. This may be via a data query being executed against the data source, and records being created, modified or deleted. At step 958, the final state of the records would be measured by executing the generated SQL statement or programming code in order to determine a final state. At step 962, a state variable 962 may be associated with the automatically determined state, and the change of the state variable may be persisted before termination at 964.

As previously described, a computer-related verification method may include the automatic generation of a query or function of a state variable. The computer-related method may be performed by a computer system comprising a processor for executing computer instructions. For example, a computer-implemented method may comprise automatically generating a query associated with a state variable of a verification model, executing the query to generate a state variable value, and storing the state variable value in a data store. The automatic generation of the query may comprise generating a database query to process database records. The query that is generated may count records of an object associated with the data store, such as a table, or a view, or records within another type of object within a database. Other types of query may also be automatically generated. For example, the database query may generate an average of one or more values in a field associated with the records. The database query may also generate a sum, average or any other function of one or more values in a field of the records. The database query may also use a user defined function, such as a function defined in a programming language or a function defined by inline Structured Query Language (SQL) function.

Additional Methods for Determining State Variables

Another method of automatically determining state variables values may be based on use of web services or web pages made available from server products. For example, MICROSOFT DYNAMICS NAV exposes methods related to business objects or entities in a page. An operation against a page, such as opening a second page from a first page, may be intercepted. The operation against the page may be considered an action, and the state of the page may be a state variable. For example, if the page is closed, it may be in state {0} and if it is open, it may be in state {1}. State variables may be constructed from interception of calls or operations against pages.

Similarly, if an operation of a web service is called, it may be intercepted. The data returned from the web service operation may be used as a value of a state service, or a state variable may be constructed based on the metadata associated with the method that was called. Similarly, method calls to any object model may be intercepted, and the data returned from the object model call may be used as state variables.

Another method of automatic determination of state variable values may be in determination of error state within a system. For example, if an object model or web service framework raises or throws an error, the state variable may be in a state indicating an error, and if the web service or object model method has not thrown an error, it may be in a non-error state.

Yet another method of automatic determination of a state variable value may be to use a number of code lines executed up to a specific state as measured by code coverage utilities. By way of an example, if there are two actions A and B, and action A covers 120 source lines of code and B covers 50 lines of code, a state variable value of 170 may be stored. If action B is executed again, an expectation may be that it covers no additional source lines of code, but if it does (e.g., because of a condition that was not true when the action was first called), then it may produce a new state because the "code coverage state variable" increased. A code line number that raises an error in the system may also be used as a state variable. By having a code line number as state variable, different errors may be treated as different states in the model. Yet another state variable may be an error message associated with an error that is raised.

The computer related methods described may operate against data sources comprising data from any domain, including Enterprise Resource Planning (ERP) data. Examples, without limitation, of ERP database objects may include the objects that comprise any one of: a sales order, a purchase order, an inventory item, a warehouse location, a bin, a financial ledger entry, a financial journal item, or a general ledger account.

Actions performed against data sources may relate to any one of creating, updating, or deleting a database object in a data source.

Use of Stored State Variables in Action Execution

Figure 10:
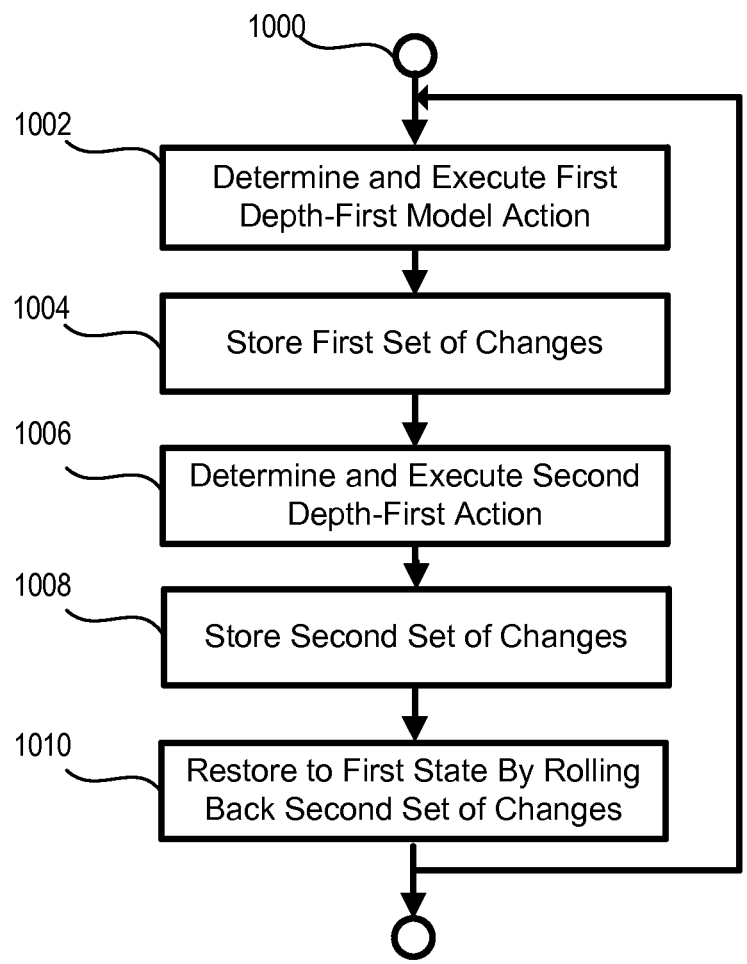
FIG. 10 illustrates a computer related method of traversing a set of actions using a depth-first traversal, such that the effect of actions may be rolled back when state is held in a cache.

FIG. 10 illustrates a computer related method of traversing a set of actions using a depth-first traversal, such that the effect of actions may be rolled back using cached values. In particular, the computer related method of FIG. 10 may be accomplished without having to execute actions against a data source. At start state 1000, a traversal of a verification model may be at an initial state. At step 1002, the first depth-first action is determined and executed. At state 1004, the first set of changes is stored. The change or values of the state may be logged, persisted to a model data store, or otherwise stored. Optionally, the method described with respect to FIG. 9 may be used to determine state variable changes. At step 1006, a second depth-first action is determined and executed. At step 1008, a second set of changes in state of the verification model are recorded. At step 1010, the model may be placed back to the first state, that was present at 1006, by rolling back the state variable changes that occurred in step 1008. Accordingly, to move back to a model state, state variables may be modified back to their original values without having to perform any actions. As described previously, state values may be determined using automatically generated queries.

Figure 11:
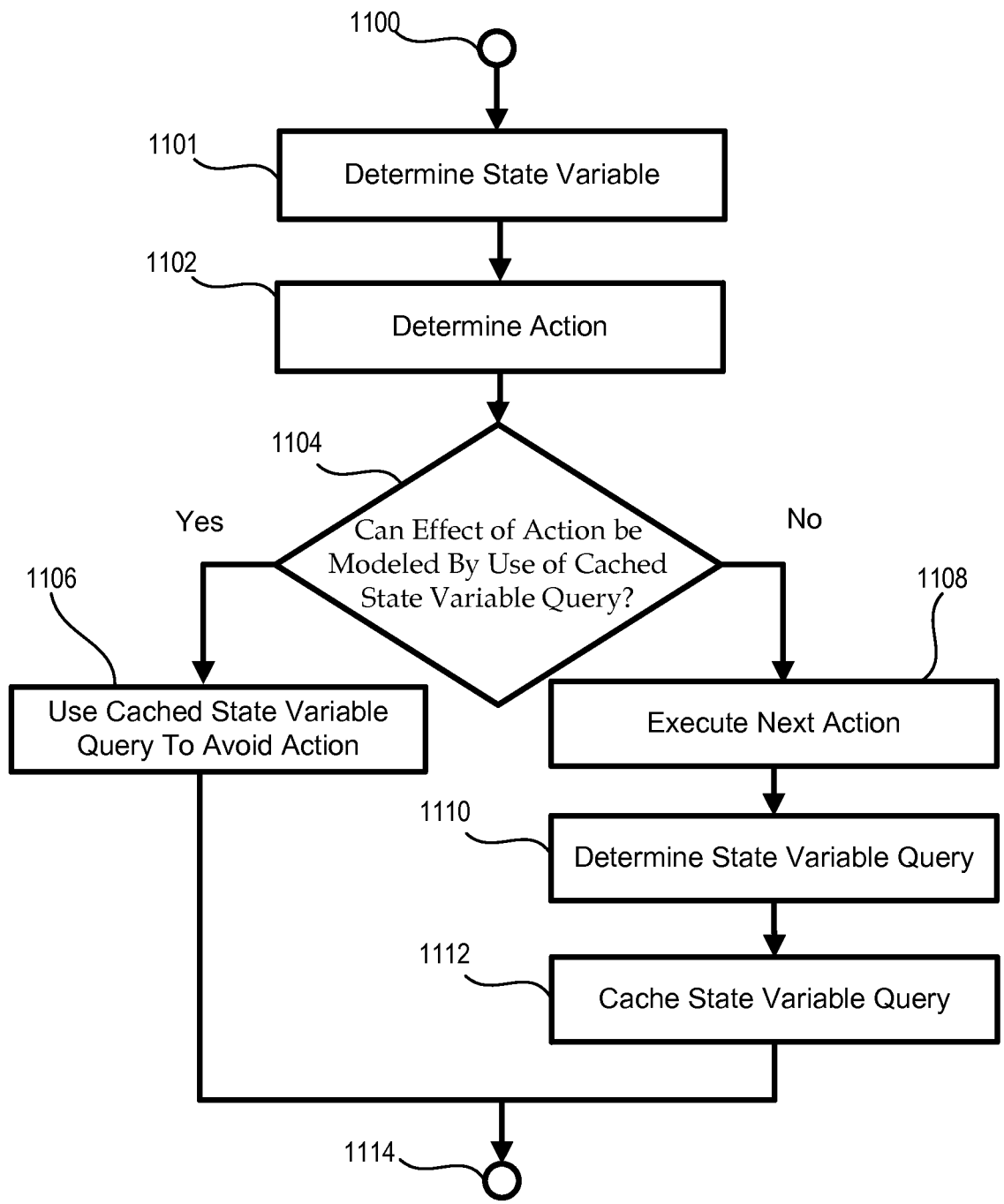
FIG. 11 illustrates a computer related method of using cached information within a verification model.

FIG. 11 illustrates a computer related method of using cached information within a data verification model. A technical advantage of the computer method is that it may impart more efficiency to verification analysis. At start state 1100, an action to perform against the data source may be performed. At step 1101, a state variable is determined. At step 1102, an action is determined. However, instead of executing the action, step 1104 may determine whether the effect of the action on model state can be modeled by use of cached state variable information. At conditional step 1104, if the effect can be modeled, then step 1106 may use cached state or state variable information to model the effect of the action. For example, if the cached state variable query determines that the action would have no effect on a data source, the action need not be executed. If the effect of the action cannot be modeled using cached state variable information, then conditional step 1104 branches to step 1108 and executes the next action against the data source to be verified. At 1110, a value of the state variable is automatically determined. This determination may via dynamic query interception, static analysis, or other computer methods described above. At step 1112, the state variable query may be cached. At step 1114, the method is terminated.

Automatic state variable generation may be used in conjunction with depth-based on breadth-based traversals, or other traversal order, of actions in a verification model. For example, a computer-related method may execute a depth first model-based action, the depth first model-based action causing a first version of a database. A value of a state variable may then be stored, and the computer related method may execute a second depth first model-based action. The method may then store another value of the state variable.

The state variable query may be cached in association with an action. After determining the next action to execute, a computer-related method may determine whether a state variable query is stored in association with an action, and whether an action would have an effect. This use of cached state variable may be done without having to execute the action itself, which may aid in performance and computational resource usage.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method comprising:
    automatically intercepting data queries to a data source, the data queries including:
        a first data query configured to update a first data object in the data source, and
        a second data query configured to update a second data object in the data source after execution of the first data query;
    transforming the first data query into a first state variable query configured to inspect the first data object in the data source;
    transforming the second data query into a second state variable query configured to inspect the second data object in the data source;
    executing the first state variable query and the second state variable query before the data queries are executed against the data source to automatically generate an initial state variable value of the first data object and an initial state variable value of the second data object;
    automatically determining an initial state of a model of the data source by combining the initial state variable value of the first data object with the initial state variable value of the second data object;
    executing the first state variable query and the second variable state query after the data queries are executed against the data source to automatically generate a final state variable value of the first data object and a final state variable value of the second data object;
    automatically determining a final state of the model of the data source by combining the final state variable value of the first data object with the final state variable value of the second data object; and
    providing a user interface that displays the initial state of the model of the data source, the final state of the model of the data source, and a list of actions executed against the data source.

2. The computer-implemented method of claim 1, further comprising:
    providing a user interface that displays the first state variable query in association with the first data object and the second state variable query in association with the second data object.

3. The computer-implemented method of claim 1, wherein the first state variable query counts records within the first data object in the data source.

4. The computer-implemented method of claim 1, wherein:
    the first data object is a table in the data source, and
    the first state variable query generates a count of rows within the table.

5. The computer-implemented method of claim 1, wherein the first state variable query generates an average of one or more values in a field of the first data object in the data source.

6. The computer-implemented method of claim 1, wherein the first state variable query generates a sum of one or more values in a field of the first data object in the data source.

7. The computer-implemented method of claim 1, wherein the first state variable query determines one or more of:
    a hash of a text field of the first data object, or
    a checksum of a binary data field of the first data object.

8. The computer-implemented method of claim 1, wherein the data source stores Enterprise Resource Planning (ERP) data.

9. The computer-implemented method of claim 1, wherein the first data query relates to any one of creating, updating, or deleting a record in the first data object.

10. The computer-implemented method of claim 9, wherein the record comprises any one of: a sales order, a purchase order, an inventory item, a warehouse location, a bin, a financial ledger entry, a financial journal item, or a general ledger account.

11. The computer-implemented method of claim 1, further comprising:
    executing a depth-first traversal of the model of the data source to determine if errors occurred during a transition from the initial state of model of the data source to the final state of the model of the data source.

12. The computer-implemented method of claim 1, further comprising at least one of:
    caching the first state variable query and the second state variable query, or
    persisting the first state variable query and the second state variable query in a data store.

13. A computer system comprising:
a processor for executing computer instructions; and
memory storing computer instructions configured to perform a method comprising:
   automatically intercepting data queries to a data source, the data queries including:
      a first data query configured to update a first data object in the data source, and
      a second data query configured to update a second data object in the data source after execution of the first data query;
   transforming the first data query into a first state variable query configured to inspect the first data object in the data source;
   transforming the second data query into a second state variable query configured to inspect the second data object in the data source;
   executing the first state variable query and the second state variable query before the data queries are executed to automatically generate an initial state variable value of the first data object and an initial state variable value of the second data object;
   automatically determining an initial state of a model of the data source by combining the initial state variable value of the first data object with the initial state variable value of the second data object;
   executing the first state variable query and the second variable state query after the data queries are executed against the data source to automatically generate a final state variable value of the first data object and a final state variable value of the second data object
   automatically determining a final state of the model of the data source by combining the final state variable value of the first data object with the final state variable value of the second data object and
   providing a user interface that displays the initial state of the model of the data source, the final state of the model of the data source, and a list of actions executed against the data source.

14. The computer system of claim 13, wherein the memory further stores computer instructions configured to:
   provide a user interface that displays the first state variable query in association with the first data object and the second state variable query in association with the second data object.

15. The computer system of claim 13, wherein the first state variable query determines any one of the following: a count of database records, a count of rows within a table, an average of one or more values in a field of the first data object, a sum of one or more values in a field of the first data object, a result from an inline Structured Query Language (SQL) function, a hash of a set of values, or a checksum of values within a field.

16. The computer system of claim 13, wherein the data source stores Enterprise Resource Planning (ERP) data.

17. A computer-readable storage medium containing computer executable instructions, that when executed by a computer, cause the computer to perform a method comprising:
   automatically intercepting data queries to a data source, the data queries including:
      a first data query configured to update a first data object in the data source, and
      a second data query configured to update a second data object in the data source after execution of the first data query;
   transforming the first data query into a first state variable query configured to inspect the first data object in the data source;
   transforming the second data query into a second state variable query configured to inspect the second data object in the data source;
   executing the first state variable query and the second state variable query before the data queries are executed to automatically generate an initial state variable value of the first data object and an initial state variable value of the second data object;
   automatically determining an initial state of a model of the data source by combining the initial state variable value of the first data object with the initial state variable value of the second data object
   executing the first state variable query and the second variable state query after the data queries are executed against the data source to automatically generate a final state variable value of the first data object and a final state variable value of the second data object;
   automatically determining a final state of the model of the data source by combining the final state variable value of the first data object with the final state variable value of the second data object; and
   providing a user interface that displays the initial state of the model of the data source, the final state of the model of the data source, and a list of actions executed against the data source.

18. The computer-readable storage medium of claim 17, wherein the first data query relates to any one of creating, updating, or deleting a record in the first data object.

19. The computer-readable storage medium of claim 17, wherein the first state variable query determines any one of the following: a count of database records, a count of rows within a table, an average of one or more values in a field of the first data object, a sum of one or more values in a field of the first data object, a result from an inline Structured Query Language (SQL) function, a hash of a set of values, or a checksum of values within a field.

20. The computer-readable storage medium of claim 17, wherein the data source stores Enterprise Resource Planning (ERP) data.

* * * * *